United States Patent [19]
Christensen et al.

[11] Patent Number: 5,311,686
[45] Date of Patent: May 17, 1994

[54] ILLUMINATED NATURAL GAS FLOW DISPLAY PANEL ASSEMBLY

[75] Inventors: Kenneth K. Christensen, Grand Junction; Randy A. Bishop, Broomfield; Daniel Bettis, Littleton; Michael Markano, Fort Collins, all of Colo.

[73] Assignee: Public Service Company of Colorado, Denver, Colo.

[21] Appl. No.: 819,460

[22] Filed: Jan. 10, 1992

[51] Int. Cl.$^5$ .................. G09F 13/06; G09B 25/02
[52] U.S. Cl. ............................. 40/442; 434/151
[58] Field of Search .............. 40/442, 444, 544; 434/268, 72, 151

[56] References Cited

U.S. PATENT DOCUMENTS

| | | | |
|---|---|---|---|
| 2,196,298 | 4/1940 | Garrison et al. | 434/268 |
| 2,523,508 | 9/1950 | Ledgett | 434/72 |
| 3,054,204 | 9/1962 | Yates . | |
| 3,359,652 | 12/1967 | Prosser et al. . | |
| 3,379,864 | 4/1968 | Peterson . | |
| 3,688,008 | 8/1972 | Krieger, Sr. | 434/268 |
| 3,704,528 | 12/1972 | Lewis | 434/268 |
| 3,715,822 | 2/1973 | Hansen, Jr. et al. . | |
| 3,839,804 | 10/1974 | Amend et al. . | |
| 3,934,349 | 1/1976 | Sanjara | 40/442 X |
| 4,001,810 | 1/1977 | Olsen | 40/442 X |
| 4,419,655 | 12/1983 | May | 40/442 X |
| 4,439,818 | 3/1984 | Scheib . | |
| 4,667,427 | 5/1987 | Been | 40/442 |
| 4,888,706 | 12/1989 | Rush et al. . | |

*Primary Examiner*—Kenneth J. Dorner
*Assistant Examiner*—J. Bonifanti
*Attorney, Agent, or Firm*—John E. Reilly

[57] ABSTRACT

An illuminated natural gas display panel assembly simulates the generation and transmission of natural gas to different classes of users by means of a plurality of elongated strips of light-transmitting arrays, each strip made up of a plurality of LEDs and with different light-sequencing circuits for individually controlling the rate and direction of sequencing of the lights to represent a desired pressure level and direction of flow along each said array; and different colored light elements are employed to aid in giving the optical illusion of different pressure levels along each of the light-transmitting arrays.

13 Claims, 2 Drawing Sheets

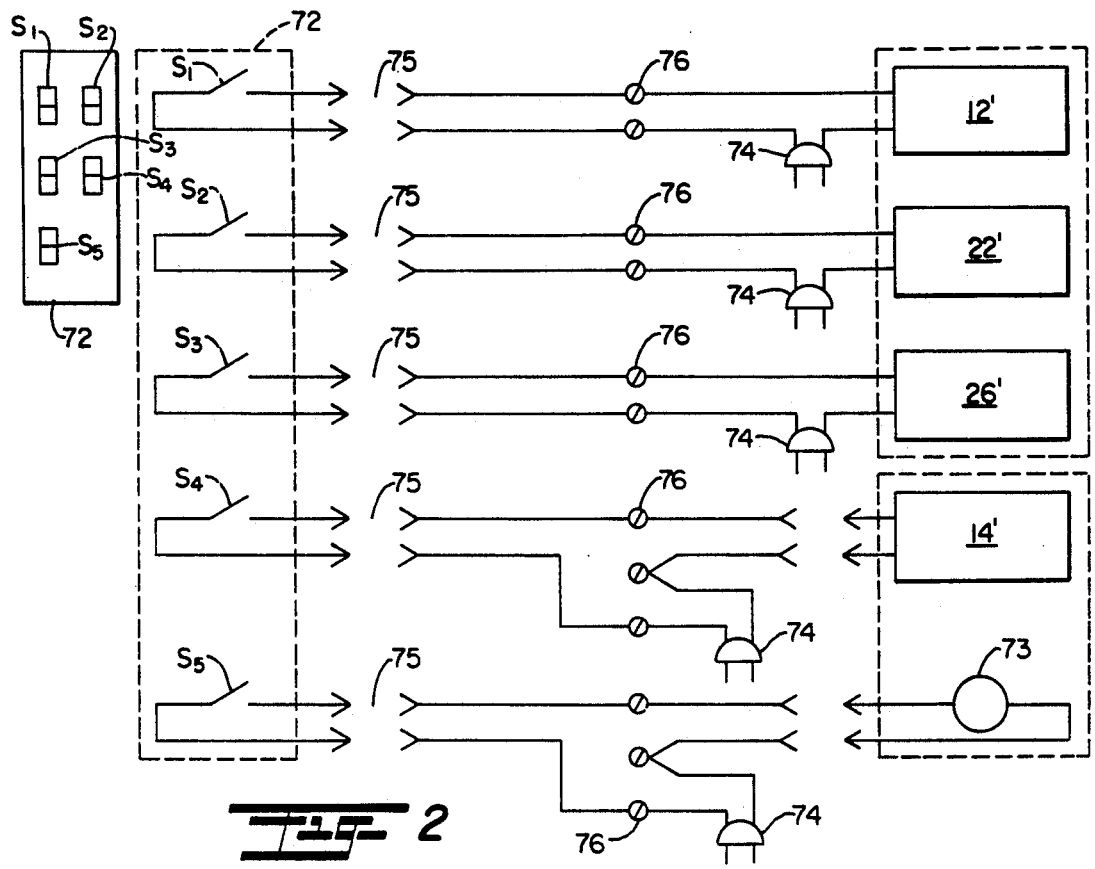
_Fig. 2_
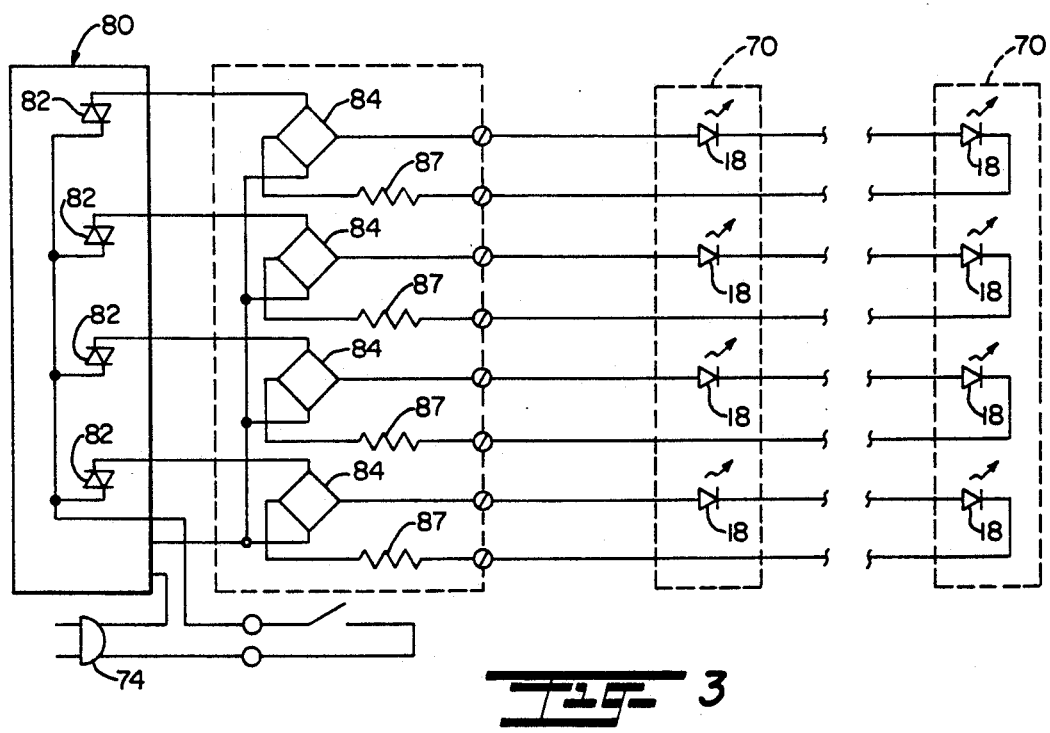
_Fig. 3_

ILLUMINATED NATURAL GAS FLOW DISPLAY PANEL ASSEMBLY

This invention relates to illuminated displays; and more particularly relates to a novel and improved natural gas safety display panel assembly to simulate the generation and transmission of natural gas to different types of users.

BACKGROUND AND FIELD OF THE INVENTION

Various systems have been devised for illustrating fluid flow along different paths of travel and many of these systems take the form of illuminated displays. For instance, U.S. Pat. No. 4,667,427 to T. S. Been discloses a display panel having light-transmitting holes to represent one or more fluid flow paths and wherein the light elements may be of different colors to represent the different fluids or flow characteristics of the fluids.

In U.S. Pat. No. 4,439,818 to J. J. Scheib there is disclosed the use of LED lighting strips in which the LEDs are connected in parallel with one another in series with a resistor mounted on each segment of a strip. U.S. Pat. No. 3,715,822 to L. B. Hansen, Jr. et al is directed more to a display utilizing a series of lights to simulate a particular pattern of movement, such as, fluid flow in which the lights are sequentially activated or flashed along a particular path.

In U.S. Pat. No. 3,839,804 to J. R. Amend et al, a display panel is provided for simulating the consumption of energy. U.S. Pat. No. 3,359,652 to Prosser et al is directed more to a display module for a pipeline network and utilizing independent pockets in a framework to provide valve openings and particular fluid flow restrictions to simulate demand characteristics. Another U.S. Pat. No. 3,054,204 to D. N. Yates discloses a polarized transparency for simulating the flow of fluids, the transparency being employed in combination with a linear polarizer to create the effect of continuous motion along different lines of a viewing screen. Other representative patents are U.S. Pat. Nos. 4,888,706 to W. F. Rush et al and 3,379,864 to P. N. Petersen.

To our knowledge, no has successfully devised a complete natural gas display system to simulate the generation and transmission of natural gas at different rates of flow to different natural gas facilities or users, such as, industrial, commercial and residential users as well as to represent the energy source and flow patterns through individual gas appliances in a home and having the ability to independently activate and control the lighting to each section to be displayed. A display system of this type can serve as a valuable aid in educating the public on the nature and characteristics of natural gas as well as conservation and safety measures to be employed in the use of natural gas.

SUMMARY OF THE INVENTION

It is therefore an object of the present invention to provide for a novel and improved natural gas display system which is particularly adaptable for use in educating the public on the nature and characteristics of natural gas as well as conservation and safety measures to be employed in the use of natural gas.

Another object of the present invention is to provide for a novel and improved illuminated display panel to simulate the pressure level and direction of flow of natural gas between a supply source and different classifications of users.

It is a still further object of the present invention to provide for a novel and improved illuminated natural gas display assembly to represent the generation and transmission of natural gas to different users as well as the pattern of flow of natural gas to individual gas appliances in a home It is an additional object of the present invention to provide in an illuminated display system for a novel and improved method and means for sequentially activating a series of light strips whereby to simulate the direction and rate of flow of natural gas to different classifications of users and to individually and manually control the lighting for each section to be displayed.

In accordance with the present invention, there has been devised a fluid flow display board for simulating the flow of fluids and specifically in simulating the generation and transmission of natural gas to users wherein the board includes visual representations of a fluid supply source and different types of users, the combination therewith comprising a plurality of elongated light-transmitting arrays on the board, each of the arrays extending from the supply source to each of the users on the board, a plurality of light elements including means supporting the light elements behind each of the arrays, and light-sequencing means associated with each of the plurality of light elements for each array for sequentially activating the light elements along each array independently of the other arrays whereby to simulate the pressure and direction of flow of fluid to each classification of users.

In a natural gas safety display panel assembly in accordance with a preferred form of the invention, the panel assembly includes a first section for a geological display to depict the manner in which natural gas is formed geologically in subsurface formations of the earth and, by means of sequencing or flashing lights, illustrates the transmission of the natural gas formed to the earth's surface and then transmitted to different users including industrial, commercial and residential users as well as the transmission of natural gas to various gas appliances within a home. The distribution of gas at higher pressure levels is distinguished from lower pressure levels by a series of light-transmitting arrays to each of the user sections and regulating the rate of sequencing as well as the color of the light-transmitting arrays at the different pressure levels. Still further, the direction of flow can be regulated by selectively controlling the direction of sequencing of lights in each array and with the ability to selectively reverse the direction of sequencing to represent reverse flow of natural gas. The light-transmitting arrays are preferably in the form of strips of LEDs mounted behind light-transmitting arrays and which can be individually interchanged and serviced as required.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIGS. 2 and 3 are schematic diagrams illustrating a preferred form of lighting control circuit employed in association with the display panel assembly of FIGS. 1 and 2.

DETAILED DESCRIPTION OF THE PREFERRED EMBODIMENT

Figure 1:
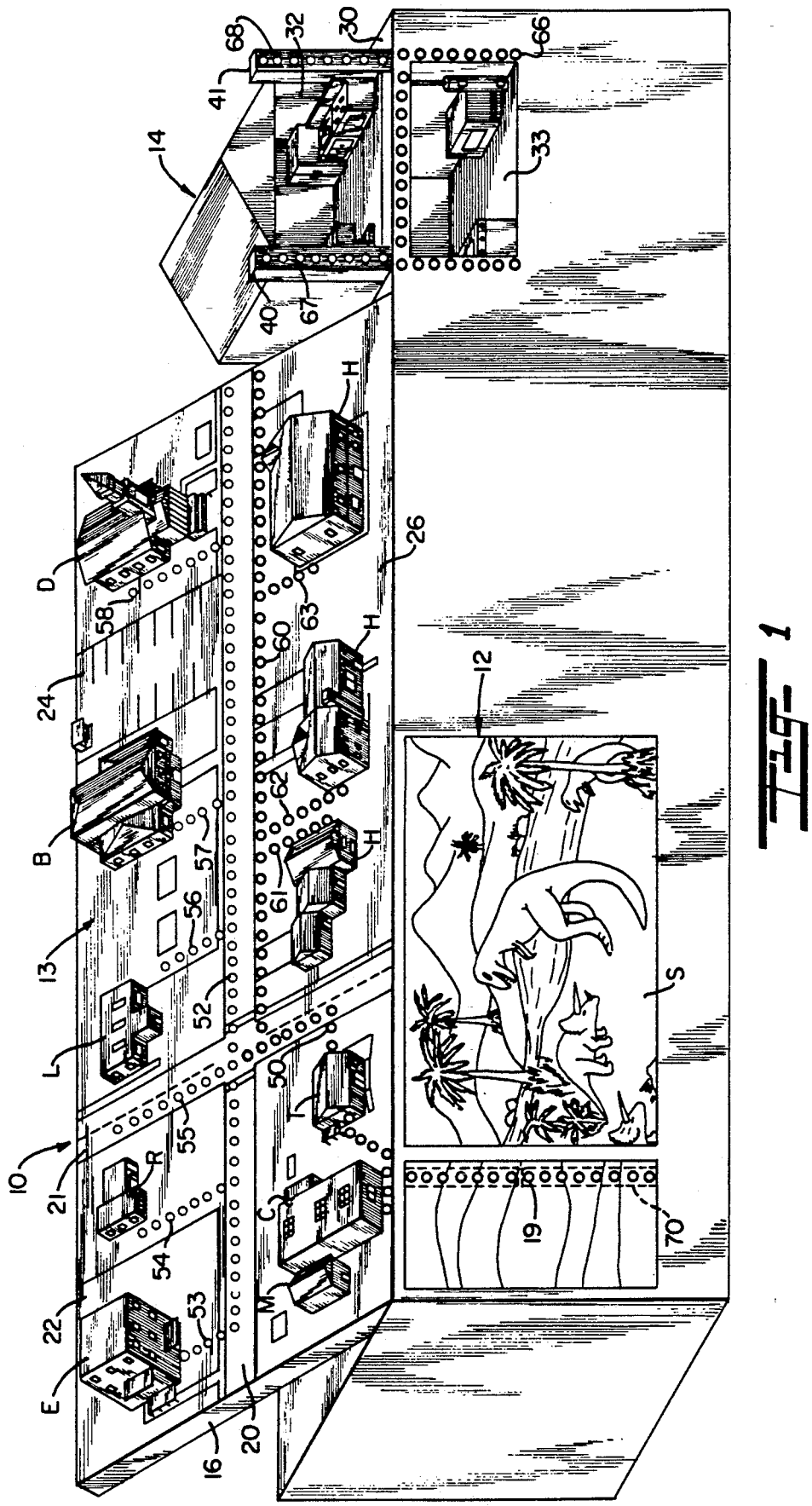
FIG. 1 is a somewhat perspective view illustrating a preferred form of illuminated natural gas display panel assembly in accordance with the present invention.

Referring in more detail to the drawings, there is illustrated in FIG. 1 a preferred form of illuminated natural gas display in the form of a panel assembly 10 including a geological display section 12 for the generation of natural gas, a natural gas transmission section 13 and a house interior 14. The section 12 is intended to depict the manner in which natural gas is formed geologically in subsurface formations of the earth and is recovered at a well head at the lower lefthand corner of the main transmission section 13. To this end, the section 13 is mounted on a display panel or board 16 which is inclined at an angle of approximately 45°, and the geological display 12 forms a separate display in front of and slightly beneath the display board 16. To represent the movement of natural gas from a subsurface formation as designated at S upwardly to the well head a vertically extending series of light elements 18 are disposed behind apertures 19, the light elements 18 being activated in a manner to be described. There is illustrated in direct association with the well head a meter station M and compressor station C, at which point the gas pressure is boosted and an odorizer is introduced into the natural gas preliminary to its movement to a "town border station" T for an individual community.

The balance of the board is divided into representations of streets and buildings in a community including a main street or thoroughfare 20 and a cross street 21. An industrial section 22, for example, may include a regulator station R, electric generator station E; a commercial section 24 includes a restaurant L, school building B and church D; and a residential area 26 is made up of a series of individual homes or residences as indicated at H. One end of the board opposite to the geological display 12 comprises a house interior as designated at 14 and in which a cutaway of a three-dimensional house is disposed on a horizontal platform 30 with a front cutaway portion 32 through the house to depict or display within the house interior various gas appliances including a gas fireplace 34, stove 35; and a hot water heater 36 and washer and dryer 37 and 38 are depicted on a lower level 33. Flues 40 and 41 extend upwardly from opposite sides of the cutaway portion 32.

An important feature of the present invention resides in the disposition and arrangement of linear arrays of light-transmitting holes or apertures 19 throughout the display to illustrate the direction and rate of gas flow to the industrial, commercial and residential areas. Thus, for example, a first light-transmitting array 50 extends from the border station T along the cross street 21 into communication with array 52 which extends the substantial length of the main street 21 and has individual linear arrays 53, 54 and 55 to the industrial area; and linear arrays 56, 57 and 58 to the commercial buildings. Another array 60 branches off of the main array 50 to extend along the main street 20 with individual channels 61, 62 and 63 to the residential buildings along the area 26.

The cutaway section 14 includes a light array 66 of inverted generally U-shaped configuration to represent the supply of gas to the individual appliances along with exhaust arrays 67 and 68 passing upwardly through the flues 40 and 41.

A series of light elements in the form of elongated or linear strips 70 of light-emitting diodes (LED) 18 are mounted for extension behind the light-transmitting holes 19 in each array so that each LED on a strip is aligned with a hole 19 represented in dotted form along the section 12. As illustrated in FIG. 2, a switch control circuit is provided with a remote hand console as indicated at 72 containing a series of five switches $S_1$, $S_2$, $S_3$, $S_4$ and $S_5$ to permit remote control of the lighting in different sections of the panel assembly by electrical connection into pin and socket connectors 75 to each of the sequencer circuits hereinafter described. For example, in the preferred form, switch $S_1$ controls a standard incandescent light source 12' for the geological display 12; switch $S_2$ controls a sequencer circuit 22' for the commercial and industrial sections 22 and 24 of the display panel; switch $S_3$ controls sequencer circuit 26' for the residential section 26 of the display panel; switch $S_4$ controls sequencer circuit 14' for the house interior 14; and switch $S_5$ includes a reversing relay 73 in order to reverse the direction of sequencing or flow through the house sequencer circuit 14' to simulate or represent creation of a reverse flow or draft in the flues 67 and 68. AC power is supplied to each of the switch circuits $S_1$ to $S_5$ through a common plug 74 so that when a switch is closed it will close its circuit between the AC power outlet or plug 74 via the pin connectors 75 and terminal strip connectors 76 to their respective lighting or sequencing circuit.

In FIG. 3, an individual sequencing circuit is represented for each of the circuits 22', 26' and 14'. Each sequencer circuit comprises a sequencer control circuit 80 which is made up of a standard Velleman Kit Model 4-Channel Sequencer K5200 manufactured and sold by Velleman Components, N. V., Gavere, Belgium, and which is modified to employ only the left-to-right chase functions of the kit via triacs 82. Each triac 82 is connected into a full wave rectifier or bridge circuit 84 to one or more of the LED strips 70. For the purpose of illustration, FIG. 4 contains two LED strips 70 and a series of four channels $C_1$, $C_2$, $C_3$ and $C_4$ each including a triac 82 and bridge circuit 84 connected to every fourth LED 18 in each strip 70 of that sequencer circuit. Although four LEDs 18 are illustrated in FIG. 4, preferably there are eight LEDs on each strip and, for example, channel $C_1$ is connected to the first and fifth LEDs 18 in each strip, channel $C_2$ is connected to the second and sixth LEDs 18, channel $C_3$ is connected to the third and seventh LEDs 18 and channel $C_4$ is connected to the fourth and eighth LEDs 18 of each strip 70. The sequencer control circuit 80 will trigger or activate each channel $C_1$ to $C_4$ in succession so that the first and fifth LEDs 18 will flash simultaneously, followed by the second and sixth LEDs 18, third and seventh LEDs 18, fourth and eighth LEDs 18 and continuously repeat that sequence or cycle so as to give the illusion of chasing or movement along the entire path or array of lights in each of the circuits 12', 22', 26' and 14' when activated. The sequencer control circuit 80 is connected to the common AC power source via plug 74, and a resistor 87 is connected on the return side of each channel leading into the bridge circuit 84 and which resistors are set in accordance with the number of LEDs controlled by each channel. For the Velleman Kit described, any number of strips 70 may be connected in series to the channels $C_1$ to $C_4$ in order to activate the entire array of LEDs for a given section. There may be in excess of ten strips connected in series for each of the commercial/industrial sections 22 and 24 and residential section 26 so long as the total number of boards does not exceed the wattage or power rating of the sequencer control circuit which, for the Velleman Kit described, is 500 watts.

In operation and use, the hand control 72 is utilized to selectively activate different sections or areas of the display panel so that in educating others on the generation and use of natural gas the display panel will serve as a visual aid. Thus when the AC plug 74 is plugged in, the switch $S_1$ can be activated to turn on the light display for the geological section 12. In discussing the generation and transmission of natural gas from a subsurface formation, the switch $S_2$ may be closed to activate the sequencer circuit 22'. This will cause the light transmitting array for the section 12 to be activated along with the lighting arrays 50, 52, 53, 54, 55, 56, 57 and 58. The LEDs throughout the section described will then be sequenced either in a left-to-right direction, or in the case of the vertically extending arrays will be activated in a vertically upward direction, to simulate the direction of flow of natural gas through those respective lines or arrays. The switch $S_3$ may then be closed to activate the sequencer circuit 26' for the residential arrays including the principal lighting array 60 and branch arrays 61, 62 and 63. Again, the LEDs are sequentially activated in a left-to-right direction along the array 60 and in a downward direction along the arrays 61 to 63.

In order to represent the somewhat higher pressure level in the lines or arrays for the industrial and commercial sections 22 and 24, the rate of sequencing may be increased for the lighting arrays for the sections 22 and 24 as compared to the rate established by the sequencer control circuit for the residential section 26. In addition, the LEDs in the industrial and commercial sections 22 and 24 may be color-coded red and the arrays for the residential section color-coded green. The red lighting will tend to give the optical allusion of somewhat greater pressure or rate of flow along those arrays than the green-lighted arrays for the residential section 26.

In discussing the gas distribution through an individual building interior, such as, the housing interior 14, switch $S_4$ is closed to activate the house sequencer circuit 14' thereby causing the LEDs to be activated through the lower array 60 and upper flue arrays 67 and 68. Again, it is desirable to employ different color-coding for the flue arrays, such as, yellow LEDs while the lower array 66 may also be pigmented or colored green as for the housing section 26. In discussing problems created by a reverse draft in the flues 40 and 44, the switch $S_5$ may be closed to activate the reversing relay 73 to reverse the sequencing through the lower array 66 as well as upper arrays 67 and 68.

It will be appreciated from the foregoing that different techniques may be employed to indicate the higher pressure level in the commercial section 24 than the residential section 26, such as, for instance, by using larger light-transmitting holes for the upper series of arrays in the industrial and commercial sections 22 and 24. Furthermore, it will be apparent that continuous channels may be employed in place of individual holes for the lighting elements or LEDs. In this relationship, a particular feature of the present invention is the utilization of strips of LEDs which can be affixed along the different arrays and individually interchanged or serviced so as to necessitate a minimum of down-time. It will be appreciated further that variations may be made in the arrangement of sections and units according to the specific nature of the display; also that the particular number of light elements sequenced may be varied according to the nature of fluid flow being illustrated.

It is therefore to be understood that the above and other modifications and changes may be made in the method and apparatus of the present invention without departing from the spirit and scope thereof as defined by the appended claims and reasonable equivalents thereof.

We claim:

1. In a natural gas display panel assembly for simulating the generation and transmission of natural gas to users wherein an opaque panel includes visual representations of a gas supply source an different types of users including industrial and residential users, the combination therewith comprising:

a plurality of elongated light-transmitting arrays on said panel, each of said arrays including a series of light-transmitting holes in said panel extending between said supply source and each of said users;

a plurality of light elements including means supporting said light elements behind said holes along each of said arrays; and light sequencing means associated with each of said plurality of light elements associated with each said array for sequentially activating said light elements simultaneously along each said array but at different sequencing rates in accordance with the pressure level of the natural gas flowing to each of said users whereby to simulate the rate an direction of flow of natural gas to each of said users.

2. In a natural gas display panel assembly according to claim 1, each of said light elements for each said type of user being of a different color.

3. In a natural gas display panel assembly according to claim 1, said panel including a cutaway of a house interior having different natural gas appliances, and a plurality of said elongated arrays and associated light elements in each said array extending to said appliances, and said light sequencing means including means for sequentially activating said light elements along each said array in said house interior.

4. In a natural gas display panel assembly according to claim 1, said light elements being in the form of light-emitting diodes, and means mounting each of said series of light-emitting diodes in strips along each of said arrays.

5. In a natural gas display panel assembly according to claim 1, said natural gas supply source including means for depicting the manner in which natural gas is formed geologically in subsurface formations of the earth and transmitted to the earth's surface along one of said arrays.

6. In a natural gas display panel assembly according to claim 5, including means depicting the production of natural gas at the earth's surface including a well head, dehydrator, scrubber and compressor station, said one array extending from said supply source to said well head, said dehydrator, said scrubber and said compressor station.

7. In a natural gas display panel assembly according to claim 3, said light-sequencing means including means for reversing the sequential activation of lights along each said array in said house interior.

8. In a fluid flow display panel assembly for simulating the flow of fluid to spaced locations on an opaque panel wherein said panel includes visual representations of a fluid supply source and different structural units representing end users for said fluid, the combination therewith comprising:
- a plurality of elongated light-transmitting, linear arrays on said panel, each of said arrays extending to one of said end users;
- a plurality of elongated strips of light elements including means supporting said strips along each of said arrays, said light-transmitting arrays being in the form of light-transmitting holes in closely spaced relation to one another, each of said strips disposed behind a plurality of said light-transmitting holes with said light elements aligned with said light-transmitting holes; and
- light-sequencing means for said strips associated with each said array for sequentially activating said light elements simultaneously along said strips of said arrays at different rates whereby to simulate the pressure and direction of flow of fluid to each of said end users.

9. In a fluid flow display panel assembly according to claim 8, each of said light-transmitting arrays including a sequencer circuit, and switching means for each of said sequencer circuits for individually activating each of said sequencer circuits independently of other of said sequencer circuits.

10. In a fluid flow display panel assembly according to claim 9, said light-sequencing means including linear arrays of light-transmitting holes, each said array connected to at least one of said light elements on each strip, and means for sequentially activating each of said light elements in succession to create the illusion of fluid movement along each of said strips.

11. In a fluid flow display panel assembly according to claim 10, said light-sequencing means including means for reversing the direction of activation of said light elements to simulate a reverse direction of flow along at least one of said arrays.

12. In a fluid flow display panel assembly according to claim 10, each of said arrays including light elements of a different color, each color selected being representative of a different end user.

13. In a fluid flow display panel assembly according to claim 10, each of said light elements being in the form of a light-emitting diode, each of said diodes being mounted behind one of said light-transmitting holes in said panel.

* * * * *